United States Patent
McCusker

(10) Patent No.: US 7,432,444 B1
(45) Date of Patent: Oct. 7, 2008

(54) TEMPORARY PROTECTIVE COVER FOR AN ELECTRICAL BOX

(76) Inventor: Leo McCusker, 16 Cote Cir., Raymond, NH (US) 03077

( * ) Notice: Subject to any disclaimer, the term of this patent is extended or adjusted under 35 U.S.C. 154(b) by 0 days.

(21) Appl. No.: 11/879,947

(22) Filed: Jul. 19, 2007

Related U.S. Application Data

(60) Provisional application No. 60/934,414, filed on Jun. 13, 2007.

(51) Int. Cl.
H02G 3/14 (2006.01)

(52) U.S. Cl. .................. 174/66; 174/67; 220/241; 220/242; 33/DIG. 10; 33/528

(58) Field of Classification Search ............ 174/66, 174/67, 50, 53, 58, 57, 54; 220/3.2–3.9, 220/241, 242; 33/DIG. 10, 528, 562; 16/DIG. 2; 118/504–506; D13/154, 156; D8/352
See application file for complete search history.

(56) References Cited

U.S. PATENT DOCUMENTS

| 2,775,812 | A | * | 1/1957 | Mohr | 220/3.8 |
|---|---|---|---|---|---|
| 5,526,952 | A | * | 6/1996 | Green | 220/3.8 |
| 5,639,991 | A | * | 6/1997 | Schuette | 174/58 |
| 6,166,329 | A | * | 12/2000 | Oliver et al. | 174/58 |
| 6,403,883 | B1 | * | 6/2002 | Morgan et al. | 174/58 |
| 6,538,202 | B1 | * | 3/2003 | Shaffer et al. | 174/66 |
| 6,686,540 | B2 | | 2/2004 | Compagnone, Jr. | |
| 6,867,370 | B2 | | 3/2005 | Compagnone, Jr. | |
| 6,906,260 | B2 | * | 6/2005 | Grendahl | 174/66 |
| 7,075,008 | B2 | * | 7/2006 | Smith | 174/66 |
| 2002/0157851 | A1 | | 10/2002 | Compagnone, Jr. | |
| 2004/0065466 | A1 | | 4/2004 | Compagnone, Jr. | |
| 2006/0278421 | A1 | | 12/2006 | Compagnone, Jr. | |

* cited by examiner

*Primary Examiner*—Angel R Estrada
(74) *Attorney, Agent, or Firm*—Joseph E. Funk

(57) ABSTRACT

A temporary protective cover for an electrical outlet box is disclosed which is attached to the outlet box after wiring is installed but before wallboard is hung over the box. The protective cover has a protruding pin mounted in a keyhole shaped hole through the cover and when wallboard is mounted over the outlet box the protruding pin indicates the location of the box so a tool can be used to cut away wallboard covering the box while preventing wires inside the box from being cut. The protruding pin is then slid along the keyhole slot to its large end and is pushed inside the outlet box. The absence of the protruding pin makes it easier to apply spackle, paint and other materials to the wallboard and to sand it. The cover provides protection against spackle, paint, dust and other debris from entering the outlet box until the cover is removed by an electrician who then install outlets and switches.

7 Claims, 3 Drawing Sheets

(front view up)

(front view down)

(rear view up)

(rear view down)

TEMPORARY PROTECTIVE COVER FOR AN ELECTRICAL BOX

RELATED APPLICATION

This application is related to and claims benefit under co-pending U.S. Provisional Patent Application No. 60/934,414, entitled "Temporary Protective Cover For An Electrical Box", filed on Jun. 13, 2007.

FIELD OF THE INVENTION

The present invention relates generally to electrical outlet box protectors and, more particularly, to protectors for electrical wiring inside the outlet boxes.

BACKGROUND OF THE INVENTION

Electrical outlet boxes are well known in the art and are commonly used to perform two principal functions. First, an electrical outlet box commonly serves as a mounting structure for installing an electrical device, such as a light, fan or other fixture, to be exposed through a covering, such as wall board or ceiling panels. Second, an electrical outlet box commonly serves as a connection point for connecting electrical devices such as outlets and switches to electrical wires which, in turn, are connected to a main power source.

Electrical outlet boxes are commonly manufactured in various shapes and sizes. The particular size and shape of an electrical box is based largely upon the particular application in which the outlet box is to be used. In addition, depending on the application the material from which an outlet box is made will vary.

Electrical outlet boxes are typically shaped to include a back panel and one or more side panels which project perpendicularly from the back panel. The back panel and the one or more side panels together define an interior cavity into which electrical wiring is disposed. Each of the one or more side panels includes a free front edge and all the free edges collectively define an opening which provides access to the interior cavity of the outlet box. The particular volume of the interior cavity of the outlet box is typically designed based upon the number of wires entering the box and the type and number of devices attached to the outlet box. Electrical outlet boxes also commonly include one or more outwardly projecting tabs which facilitate mounting the box onto a structure. Specifically, each outwardly projecting tab is adapted to receive a securing device, such as a nail or screw, which, in turn, can be disposed into a structure, such as a support beam or outlet panel, so as to fixedly mount the outlet box onto the structure. Other inwardly projecting protrusions are adapted to receive screws or other mounting hardware of a switch, outlet or other device to be attached to the outlet box.

In use, a new-work electrical outlet box can be used to install an electrical receptacle, or outlet, into a wall in the following manner. During the preliminary stages of constructing a building, support beams, typically two-by-fours, are typically erected in order to define the general room configurations of the building. With the support beams erected, a nail disposed through each tab of the outlet box is driven into a support beam, thereby fixedly mounting the outlet box onto an associated support beam at a desired location within a room of the building.

After an electrical outlet box is attached to a wall stud or other structural member, electrical wiring which is coupled to the main electrical power source is run amongst the structural members and into the various rooms of a building. Particular wires of the electrical wiring are fed through the openings through the wall of each outlet box into its interior cavity in order to provide electrical power to the outlet or switch which is subsequently installed in the outlet box. These openings are commonly created by removing break-away tabs which are pre-formed in the walls of an outlet box.

Having mounted the electrical outlet boxes onto studs and having fed selected electrical wires into the interior cavity of the wall boxes, wall paneling, typically sheet rock but also referred to as wall board, is then mounted onto the support beams to enclose the various rooms of the building. The sections of wall board are typically mounted onto the support beams directly over the outlet boxes.

As can be appreciated, with the wall board mounted onto the support beams directly over the electrical outlet boxes, an electrician is unable to access the interior cavity of the outlet boxes and, as a result, is unable to install the electrical outlets into the outlet boxes. Accordingly, the wall board installer is required to create openings in the wall board at the location of each outlet box in order to provide a means of accessing the interior cavity of the outlet boxes. Conventionally, a router is used to pierce through the wall board and cut out a hole exposing each outlet box. The location of each outlet box behind the wall board is found by drilling a hole through the wall board at the estimated placement of the outlet boxes. Should the router hit the wiring inside an outlet box the wire is damaged. It is difficult and time consuming to fix such damaged wiring.

Once the wall board has been cut so as to expose the interior recess of the outlet boxes, a worker plasters the wall board to cover tape and mounting screws. Too often the plaster, or joint compound or stucco, gets into the outlet boxes and must later be removed with attendant difficulty. After the wall board has been plastered and sanded, another worker paints the wall board, thereby completing construction of the walls of the rooms. With construction of the walls having been completed, an electrician connects one or more electrical outlets or switches to the wires which are disposed within the interior cavity of the outlet boxes in order to electrically connect them to a main power source. The outlets and switches are fixedly retained in place by using one or more screws through openings formed in the electrical outlets and switches and into engagement with a threaded bore hole formed on the inside wall of the outlet box. A cover plate is then mounted over the outlets and switches and is secured in place by one or more screws.

Although well known and widely used in commerce, electrical outlet boxes of the type described above suffer from notable drawbacks.

As a first example, it has been found that disposing electrical wires within an outlet box having an open front end leaves the wires exposed during subsequent stages of construction, which is highly undesirable. Specifically, when an a outlet board installer or other person uses a router to cut an opening in the wall board in order to access the interior cavity of a outlet box, the router, on too many occasions, will contact the wires disposed within the box. As a consequence, the wiring is damaged and must be repaired.

As a second example, it has been found that, when a plasterer plasters over wall board or when a router is used to cut out a hole for outlet boxes, significant amounts of debris and plaster accumulate within the interior cavity of the outlet boxes. As a result, an electrician is forced to clean out the debris which has collected within the outlet boxes before installing any electrical devices. This renders the work of the electrician more labor intensive, which is highly undesirable.

As a third example, after the wallboard work is done a primer paint coat is often applied to the walls with a spray gun and the paint gets into the outlet boxes and onto the wires therein. It is difficult to remove the paint to identify the color of the wires and there is a chance of errors. In addition, some paints may contain chemicals that are detrimental to the plastic insulation on the wires.

To solve these problems various temporary protective covers for electrical outlet boxes have been devised. These covers keep debris out of the outlet boxes and protect the wiring therein. However, if a wall board installer covers an electrical outlet box with a piece of wall board and forgets to cut a hole through the wall board to expose an outlet box, the electrician has even more work to locate the outlet box and then cut a hole to expose it and complete the wiring.

Accordingly, there is a need in the prior art for a temporary protective cover for electrical outlet boxes that will provide a visual indication of its presence and position to both wallboard installers and to electricians, will prevent damage to wires inside outlet boxes, and will keep debris, plaster and paint out of outlet boxes until an electrician is ready to connect electrical outlets and switches to wires inside the boxes.

SUMMARY OF THE INVENTION

The aforementioned need in the prior art has been met by the present invention. A temporary, reusable protective cover for electrical outlet boxes is provided that provides both a visual indication of the presence and position of outlet boxes to both wall board installers and to electricians. This facilitates a wallboard installer cutting just installed wall board to expose outlet boxes there under.

Further, the novel protective cover prevents damage to wires inside outlet boxes caused by cutting wall board to expose outlet boxes, and the protective cover also keeps debris, plaster (joint compound and/or also stucco), and paint out of the outlet boxes until an electrician is ready to connect electrical outlets and switches to the wiring inside the boxes.

The protective cover is centered over the opening of an outlet box using small pins that fit into the screw holes at the top and bottom center of the box, to which holes electrical outlets or switches are normally screw mounted. The pins have a diameter slightly larger than the screw holes for mounting outlets or switches and are a spring type of plug known as a "banana plug" that compressed in diameter when inserted into the screw holes in the top and bottom of the outlet box. When the banana plug pins are inserted into the screw holes the protective cover the compressed plug pushes against the inside wall of the screw holes and the cover is thereby retained over the opening of the outlet box until later deliberately removed by the electrician.

The protective cover has a protrusion pin extending perpendicular to its front surface that causes the wallboard mounted over the cover to be dimpled or bowed outward giving a visual indication of the presence of the outlet box underneath the wallboard to the wallboard installer. With this visual indication of the presence of an outlet box the wall board installer can quickly and easily use a small router to cut onto and around the box and expose it for subsequent connection of switches, outlets etc. to wires inside the box. This minimizes router damage to the wallboard caused by initially missing an outlet box and "looking for it" by moving the router bit around to find the box, and prevents damage to wires inside the outlet box caused by the router bit entering the box and contacting the wires therein. The protective cover also keeps debris, plaster and paint out of the outlet box until an electrician is ready to connect electrical outlets and switches to the wiring inside the boxes. This speeds the electrical installation process and minimizes the chance for wiring errors and electrical shorts.

After the wall board installer has exposed the outlet box, the wall board installer or plasterer can quickly and easily cause the protrusion pin that extends from the front of the protective cover to pass inside the outlet box. This is done by sliding the protrusion pin upward along a keyhole shaped slot to the widest end of the keyhole and then pushing the pin rearward inside the outlet box. The wallboard is then more easily taped, spackled and sanded because the protrusion pin does not interfere with the process.

After the wallboard work is done the electrician returns, removes the protective covers, retrieves the protrusion pin inside the outlet box and connects switches, outlets, etc. to the wires inside the box. This is much more easily and quickly performed because there is no plaster, paint or other debris inside the outlet box. Then a vanity cover plate is mounted over the front of the outlet box in a manner known in the art. The protective cover is then reused.

DESCRIPTION OF THE DRAWING

The invention will be better understood upon reading the following Detailed Description in conjunction with the drawing in which:

FIG. 1 is a front view of the novel protective cover plate with a keyhole slot there through;

DETAILED DESCRIPTION

Figure 1:
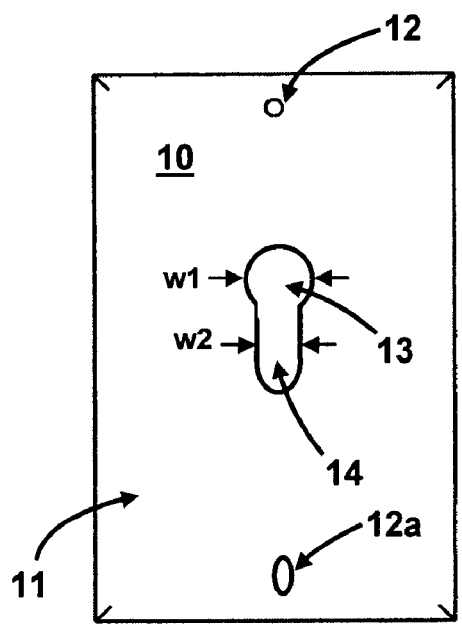

In FIG. 1 is shown a front view of the protective cover 10 of a first embodiment of the invention. This is not the preferred embodiment of the invention which is described hereinafter. It is typically molded from a tough plastic. Cover 10 has a beveled edge 31 and has a length and width that match the outside dimensions of a standard electrical outlet box. Outlet boxes come in different sizes for typically mounting one, two or three switches or outlets. While one size protective cover plate is shown and described herein, for an outlet box mounting a single switch or outlet, different sized protective covers may be made for different size electrical boxes. While the term plaster is used throughout this specification it should be understood that other terms and materials also apply. The term plaster is also known as spackle, mud or joint compound. In addition, stucco may be used as an alternate material.

There is a keyhole shaped hole through the middle area of cover plate 10 that has a round top portion 13 and an elongated narrower portion 14 as shown. Near the top and bottom edges of cover plate 10 are holes 12 and 12a through cover 10. Holes 12 and 12a are used for attaching a banana plug shaped mounting pin 19 of the type shown in FIGS. 4 and 13 and mounted as shown in FIGS. 5 through 8 and 13. These pins 19 are used to attach cover plate 10 to an outlet or other electrical box.

Sometimes electrical boxes have mounting holes that are not spaced the same distance. The reason for this is that the dimensions between the mounting holes of electrical outlet boxes vary slightly from manufacturer to manufacturer. Accordingly, outlets and switches are designed to have mounting screws that can attach to such mounting holes having slightly different spacing. To accommodate this mounting hole spacing problem the present invention has one round hole 12 with a fixed mounting pin 19, and one elongated, oval hole 12a with a movable mounting pin 19, such as shown in FIG. 5 through 8 and 13, and which are described in detail in further this detailed description. The movable mounting pin 19 mounts in an elongated mounting hole 12a through protective cover plate 10 and can move therein to accommodate differently spaced mounting holes of electrical boxes. When electrical outlet boxes do not have mounting hole spacing differences two round mounting holes 12 may be utilized and the mounting pins 19 may both be screwed into the plastic side walls of holes 12 through protective cover plate 10 as shown on the right side of FIGS. 6 through 8.

Figure 2:
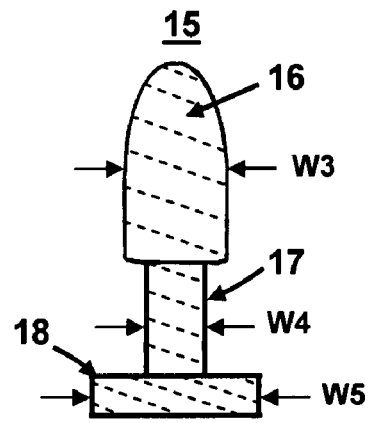
FIG. 2 is a side view of the protrusion pin that is used in conjunction with the protective cover plate to dimple or bow the just installed wallboard mounted over an outlet box and thereby indicate the presence and location of the outlet box on which the protective cover plate is temporarily mounted.

In FIG. 2 is shown a side view of a protrusion pin 15 that is used in conjunction with a protective cover plate 10 to clearly indicate the presence and location of an electrical outlet box on which the protective cover plate 10 is temporarily mounted while under a piece of wallboard (not shown). A wallboard installer or other person may then use a rotary cutting tool to quickly and easily cut to the top of the protective cover and then cut around the edges of the electrical box on which the cover is mounted to thereby expose the box. This may be done without the cutting tool going inside the electrical box and damaging wires therein.

Protrusion pin 15 has a round, elongated top 16 having a rounded tip and having a diameter of W3. The length of top 16 is long enough to clearly indicate its presence when on a protective cover plate 10 underneath a piece of wall board. The top 16 of pin 15 may be longer than shown and is shown shorter for convenience. Below tip 16 is a round, necked down portion 17 having a diameter of W4. At the bottom is a round base 18 that has a diameter of W5. The length of necked down portion 17 is only slightly longer than the thickness of protective cover plate 10 and facilitates its use therewith. The dimensions W1, W2 and W3 are important to the operation of the invention as described in greater detail further in this Detailed Description.

Figure 3:
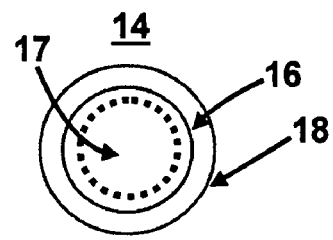
FIG. 3 is a top view of the protrusion pin.

FIG. 3 is a top view of protrusion pin 15 showing its round shape and the relative sizes of portions 16, 17 and 18.

Figure 4:
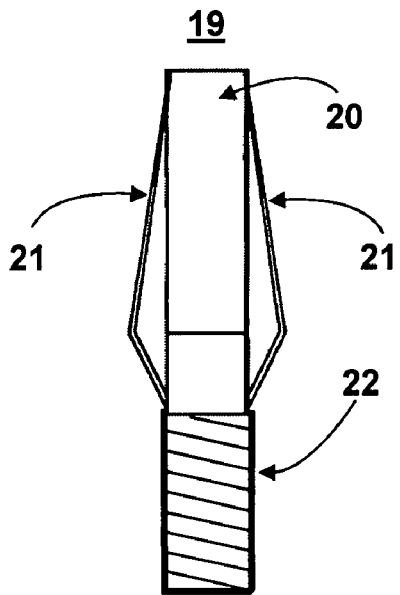
FIG. 4 is a side view of banana plug shaped mounting pin that is used to mount a protective cover plate over an outlet box.
Figure 6:
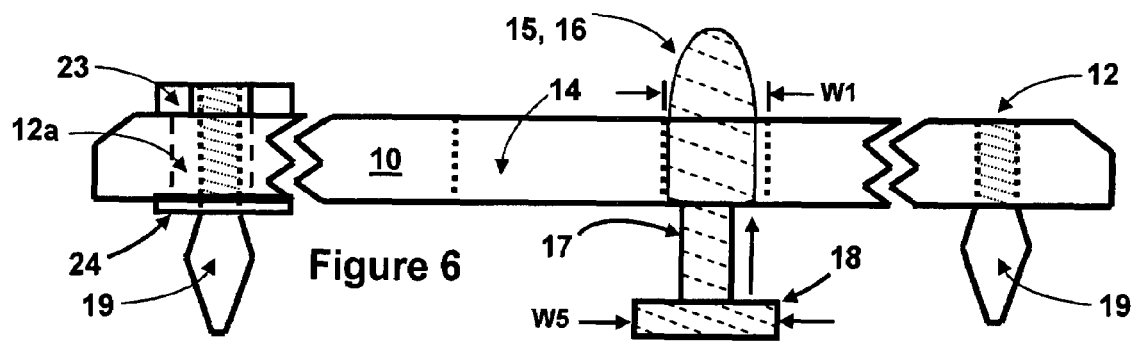
FIG. 6 is a side view of the protective cover plate showing the protrusion pin as it is being inserted through the keyhole shaped opening through the cover plate from the rear of the cover plate.
Figure 7:
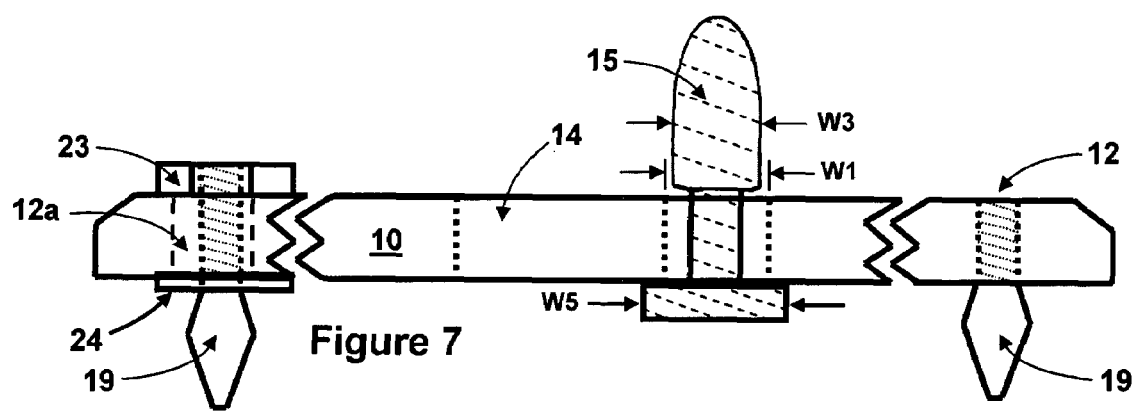
FIG. 7 is a side view of the protective cover plate showing the protrusion pin after it is fully inserted through the keyhole shaped opening through the cover plate but before is has been slid into its retaining position in the narrow portion of the keyhole shaped opening.
Figure 8:
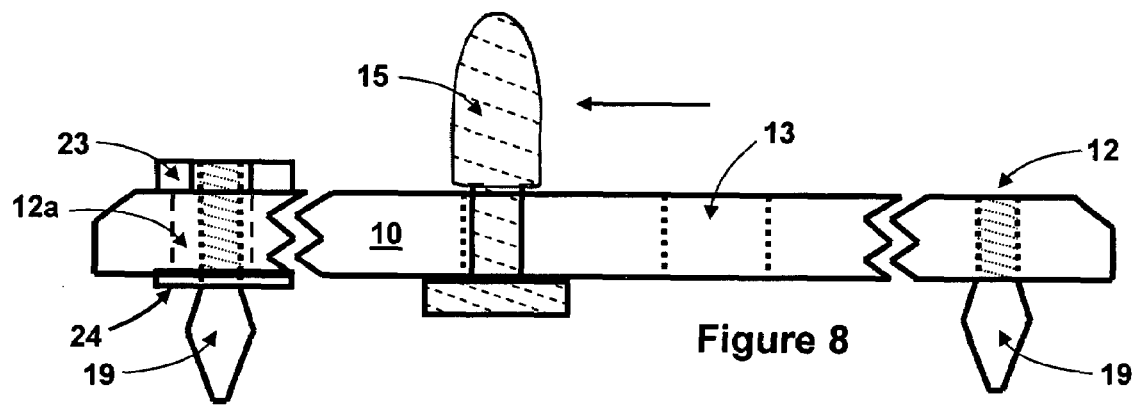
FIG. 8 is a side view of the protective cover plate showing the fully inserted protrusion pin after it has been slid into the narrow portion of the keyhole shaped opening where it is prevented from being pushed back through the cover plate.

In FIG. 4 is shown a detailed side view of a mounting pin 19 which has been described briefly hereinabove. It has a base 22 having a length slightly less than the thickness of protective plate 10 and base 22 is threaded as shown. The threads are used to cut into the side walls of a mounting hole 12 when a mounting pin 19 is screwed therein as shown in FIGS. 6, 7 and 8. The length of threaded base 22 is slightly less than the depth of a hole 12 which is the thickness of protective cover plate 10. Pin 19 has a compressible tip 20 that has a plurality of conductive, compressible spring pieces 21 located about its longitudinal axis. The outside diameter of pin 19 at the widest point of its spring pieces 21 is slightly larger than the diameter of a hole 12. As a pin 19 is inserted into a mounting hole 12 the spring pieces 21 are compressed and push back against the side walls of hole 12, thereby firmly holding protective cover plate 10 to the front of an electrical outlet box.

Figure 5:
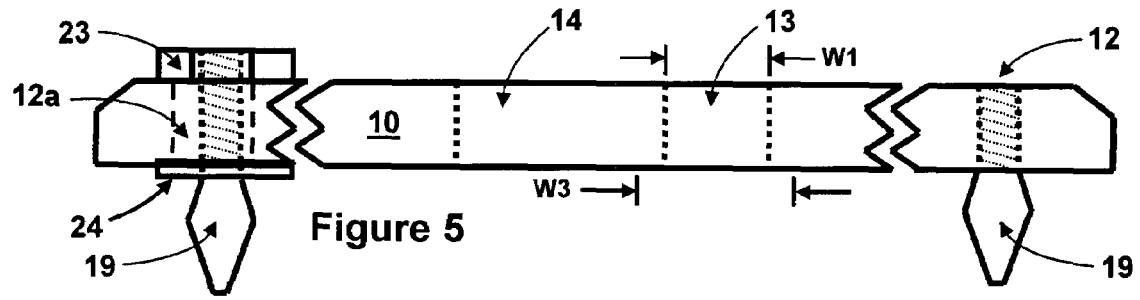
FIG. 5 is a side view of the protective cover plate showing the banana plug shaped mounting pins mounted thereto, and showing the keyhole shaped hole through the cover plate used for mounting the protrusion pin.

In FIG. 5 is shown a side view of a protective cover plate 10 showing the banana plug shaped mounting pins 19 mounted thereto, and showing the keyhole shaped hole 13, 14 through the cover plate used for mounting a protrusion pin (not shown in this Figure). Mounting pin 19 at the right side of FIG. 5 screws into a mounting hole 12 and its threads bite into the plastic side walls of hole 12. Mounting pin 19 at the left side of FIG. 5 mounts to elongated hole 12a in a slidable fashion to permit cover plate 10 to attach to electrical outlet boxes having mounting holes that are spaced differently. This is described hereinafter in greater detail with reference to FIG. 13. All edges of cover plate 16 are beveled but may be rounded.

In FIG. 6 is shown a side view of a protective cover plate 10 showing the keyhole shaped hole having wider, circular portion 13 and narrower slot 14 through the cover plate 10 and a protrusion pin 15 is being inserted through wider, circular keyhole portion 13 from the rear of protective cover plate 10. The diameter W3 of round, elongated top 16 of protrusion pin 15 is slightly less than the diameter W1 of keyhole portion 13 which permits the easy passage of top 16 there through. However, the diameter W5 of base 18 is greater than the diameter W1 of hole 13 so protrusion pin 15 cannot pass all the way through cover plate 10.

In FIG. 7 is shown a side view of the protective cover 10 showing the keyhole shaped hole having wider, circular portion 13 and narrower slot 14 through the cover plate 10 and protrusion pin 15 is fully inserted through wider, circular keyhole portion 13 from the rear of protective cover plate 10. As described in the previous paragraph the diameter W5 of base 18 is greater than the diameter W1 of hole 13 so protrusion pin 15 cannot pass all the way through cover plate 10 as can be seen in the Figure.

In FIG. 8 is shown a side view of the protective cover 10 showing the keyhole shaped hole having wider, circular portion 13 and narrower slot 14 through the cover plate 10 and protrusion pin 15 is fully inserted through wider, circular keyhole portion 13 from the rear of protective cover plate 10 and then is slid into the narrower elongated slot 14 of the keyhole. The diameter W3 of round, elongated top 16 of protrusion pin 15 is wider than the width W2 (FIG. 1) of the elongated slot of the keyhole so top 16 cannot move rearward through protective cover plate 10. The diameter W5 of base 18 is also greater than the width W2 (FIG. 1) of the elongated slot of the keyhole so protrusion pin 15 cannot pass through cover plate 10 as can be seen in FIG. 8. Cover plate 10 is mounted on an electrical outlet box so the wider portion of the keyhole is higher than the narrower elongated slot. Thus, gravity and some friction will retain protrusion pin 15 in the elongated slot 14 of the keyhole until it is deliberately slid upward to the position shown in FIG. 6 and pin 15 is then pushed toward the rear of cover plate 10. This is also shown in FIGS. 9 through 12 which are described hereinafter.

Figure 9:
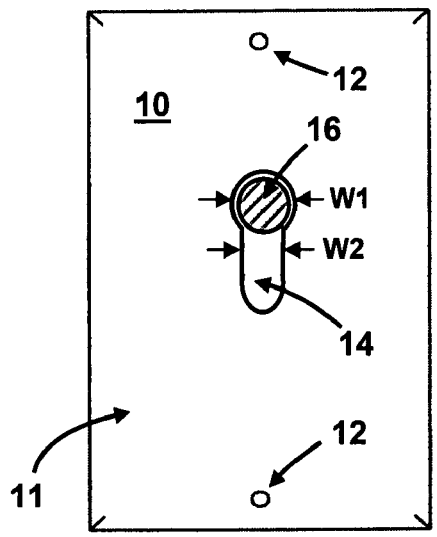
FIG. 9 is a front view of the protective cover plate with the protrusion pin as it is being inserted through the cover plate from the rear and fully extends outward from the front thereof.

In FIG. 9 is shown a frontal view of protective plate 10 with the top 16 of protrusion pin 15 completely inserted through elongated hole 19 via keyhole shaped hole 24, but before it is slid along the elongated slot 14 of the keyhole to be retained to protective cover 10. In this Figure it can better be seen that with the diameter W3 of top 16 being greater than the diameter of circular portion 13 of the keyhole that top 16 can easily pass through protective plate 10.

Figure 10:
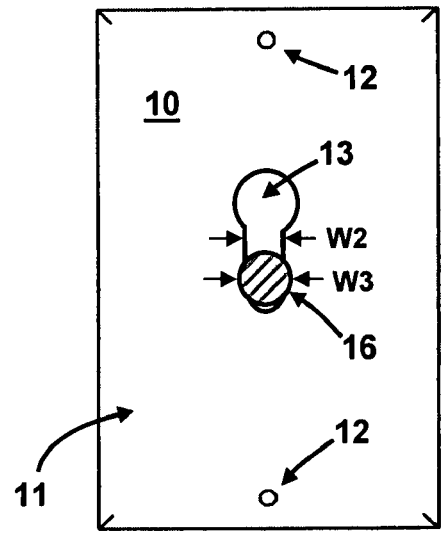
FIG. 10 is a front view of the protective cover plate with the protrusion pin in its final, centered position after being extended through the protective cover from the rear and being slid into the narrow portion of the keyhole shaped hole.

In FIG. 10 is shown a frontal view of protective plate 10 with the top 16 of protrusion pin 15 being slid along narrower elongated slot 14 to the bottom of the keyhole. With the diameter W3 of top 16 being wider than the width W2 of the elongated slot 14 protrusion pin 15 is cannot pass back through protective plate 10. At the same time, as previously described, the base 18 of protrusion pin 14 prevents pin 14 from passing forward through protective plate 10. This is shown in and described in greater detail with reference to FIGS. 11 and 12. In this position protrusion pin 15 cannot be removed from protective cover 10 in a direction perpendicular to cover 10.

Figure 11:
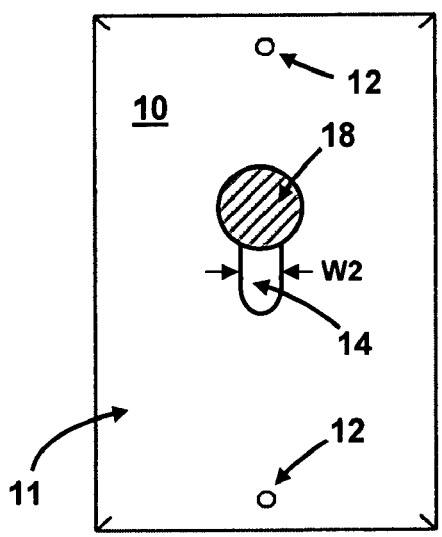
FIG. 11 is a rear view of the protective cover plate with the protrusion pin as it is being inserted through the cover plate from the rear to fully extend outward from the front of the plate.

In FIG. 11 is shown a rear view of protective plate 10 with the base 18 of protrusion pin resting against the back side of plate 10 after pin 15 is completely inserted through the round, wider top 13 of the keyhole, but before it is slid along the elongated slot 14 of the keyhole to be retained to protective cover 10. In this Figure it can better be seen that with the diameter W5 of base 18 being greater than the diameter of circular portion 13 of the keyhole that base 18 cannot pass forward through protective plate 10.

Figure 12:
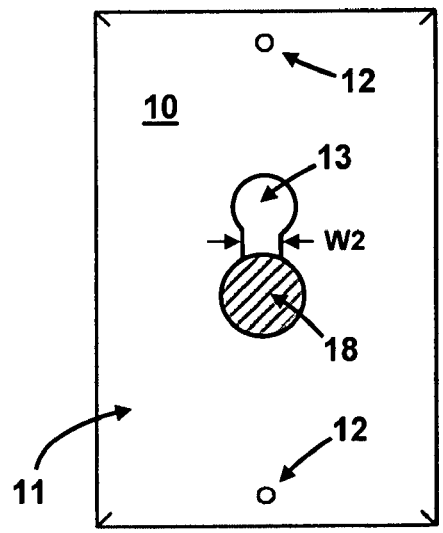
FIG. 12 is a rear view of the protective plate with the protrusion pin in its final, centered position after being extended through the protective cover from the rear and being slid into the narrow portion of the keyhole shaped hole.

In FIG. 12 shown a rear view of protective plate 10 with the base 18 of protrusion pin 15 resting against the back side of plate 10 after pin 15 has been completely inserted through the round, wider top 13 of the keyhole, and then has been slid along the elongated slot 14. In this Figure it can better be seen that with the diameter W5 of base 18 being greater than the width of elongated slot 14 of the keyhole that base 18 cannot pass forward through protective plate 10. In this position protrusion pin 15 cannot be removed from protective cover 10 in a direction perpendicular to cover 10.

Figure 13:
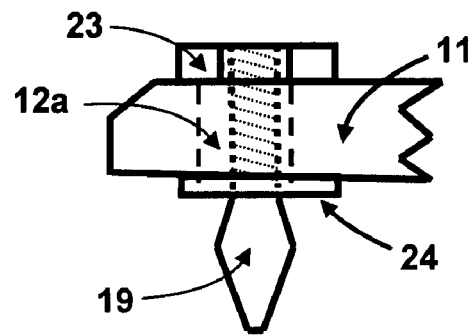
FIG. 13 is a side view of a banana plug shaped mounting pin mounted through a protective cover plate in a slidable manner to facilitate mounting the cover over electrical outlet boxes having differently spaced mounting holes.

In FIG. 13 is shown a side view of a banana plug shaped mounting pin 19 mounted through a protective cover plate in a slidable manner to facilitate mounting the cover over electrical outlet boxes having differently spaced mounting holes. The hole 12*a* is elongated as shown better in FIG. 1, and the diameter of the threaded portion 22 of mounting pin 19 being smaller than the hole permits mounting pin 19 to move within hole 12*a*. To captivate pin 19 in hole 12*a* a washer 24 is placed over mounting pin 19 adjacent to its compressible top 20 as shown. In addition, the threaded portion 22 of mounting pin 19 is longer than used with hole 12 and is greater than the thickness of protective plate 10 so that it extends beyond protective plate 10 where a wide nut 23 or another fastener is screwed onto or is otherwise fastened to the end of threaded portion 22 as shown. A thread lock compound is preferably used with nut 23 so that it will be retained to threaded portion 22 while permitting free movement of mounting pin 19 in elongated hole 12*a*.

While what has been described herein is the preferred embodiment of the invention it will be obvious to those skilled in the art that numerous changes may be made without departing from the spirit and scope of the invention. For example, a hollow may be formed in the interior of protective plate 10 which permits the base 19 of a protrusion pin 15 to enter the hollow to provide additional retention capability of pin 15 to plate 10.

What is claimed is:

1. A protective cover for an electrical outlet box of the type having a frontal access opening and attachment ears with mounting holes at the top and bottom of the box, wallboard is mounted over an electrical outlet box with a protective cover thereon, the wallboard is cut to expose the electrical outlet box and spackling is then applied, the protective cover protecting wiring inside the outlet box and preventing spackling from entering the outlet box, the protective cover comprising:
    a flat plate having front and rear surfaces;
    a keyhole shaped hole through the plate, the keyhole shaped hole having a wider, circular portion and a narrower elongated portion adjoining the wider, circular portion;
    a mounting pin attached to the rear surface of the flat plate, the mounting pin being inserted into one of the mounting holes of the outlet box when the protective cover is affixed over the frontal access opening of the outlet box; and
    a protrusion pin, the protrusion pin being inserted through the wider, circular portion of the keyhole shaped hole from the rear surface of the flat plate, the protrusion pin then being slid into the narrower elongated portion of the keyhole shaped hole where it is retained to the flat plate before the protective cover is affixed over the frontal access opening of the outlet box;
    wherein, the protrusion pin indicates the presence of the electrical outlet box over which the protective cover is affixed when wallboard is mounted over the outlet box, to remove the protrusion pin after the wallboard is cut to expose the outlet box the protrusion pin is slid from the narrower elongated portion of the keyhole shaped hole to the wider, circular portion of the keyhole shaped hole and the protrusion pin is pushed inside the outlet box over the frontal access opening of which the protective cover is affixed, and the removal of the protrusion pin makes it easier to spackle, sand and paint the wallboard before the cover is removed to mount electrical devices such as outlets and switches to the outlet box.

2. The protective cover for an electrical outlet box of claim 1 wherein the wider, circular portion of the keyhole shaped hole has a diameter of W1 and the narrower elongated portion adjoining the wider, circular portion has a width of W2 and W1 is greater than W2; wherein the protrusion pin has a top having a diameter of W3, a round, necked down middle portion having a diameter of W4, and a round base having a diameter of W5, where W5 is greater than W3 and W3 and W5 are both greater than W4; wherein W3 is less than W1, and W5 is greater than both W1 and W2 so the protrusion pin top can extend through the protective cover but the protrusion pin base prevents the protective cover from ever passing through the protective cover; and wherein W3 is greater than W2 so the protrusion pin top cannot pass back through the narrower elongated portion of the keyhole hole after the protrusion pin has been slid into the narrower elongated portion of the keyhole shaped hole where it is retained to the flat plate.

3. The protective cover for an electrical outlet box of claim 2 wherein there are two mounting pins attached to the rear surface of the flat plate, one near each of the top and the bottom of the plate, the mounting pins being respectively inserted into the mounting holes in the attachment ears at the top and bottom of the box to affix the protective cover over the frontal access opening of the outlet box.

4. The protective cover for an electrical outlet box of claim 3 wherein the flat plate has two holes through the plate, one hole near the top rear of the plate and the other hole near the bottom rear of the plate, and a mounting pin is mounted in each hole and extend from the rear of the flat plate.

5. The protective cover for an electrical outlet box of claim 4 wherein one of the two holes through the flat plate is elongated and the mounting pin mounted in the elongated hole can move parallel to the front surface of the flat plate to accommodate mounting the protective cover on outlet boxes having mounting holes that may have different spacing.

6. The protective cover for an electrical outlet box of claim 1 wherein the flat plate has two holes through the plate, one hole near the top rear of the plate and the other hole near the bottom rear of the plate, and a mounting pin is inserted into each hole to extend from the rear of the flat plate.

7. The protective cover for an electrical outlet box of claim 6 wherein at least one of the holes through the flat plate is elongated and the protrusion pins mounted in the elongated holes can move parallel to the front surface of the flat plate to accommodate mounting the protective cover on outlet boxes having mounting holes that may have different spacing.

* * * * *